US010530108B2

(12) United States Patent
Liu

(10) Patent No.: US 10,530,108 B2
(45) Date of Patent: Jan. 7, 2020

(54) UNIVERSAL SERIAL BUS HUB

(71) Applicant: FSP TECHNOLOGY INC., Taoyuan (TW)

(72) Inventor: Chia-Ming Liu, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 173 days.

(21) Appl. No.: 15/805,102

(22) Filed: Nov. 6, 2017

(65) Prior Publication Data

US 2018/0131148 A1 May 10, 2018

(30) Foreign Application Priority Data

Nov. 7, 2016 (TW) .............................. 105136159 A

(51) Int. Cl.
*H01R 31/02* (2006.01)
*G05B 15/02* (2006.01)
*G06F 1/26* (2006.01)
*G06F 13/40* (2006.01)
*G06F 13/42* (2006.01)

(52) U.S. Cl.
CPC ............. *H01R 31/02* (2013.01); *G05B 15/02* (2013.01); *G06F 1/266* (2013.01); *G06F 13/4081* (2013.01); *G06F 13/4282* (2013.01); *G06F 2213/0042* (2013.01)

(58) Field of Classification Search
CPC ..... G05B 15/02; G06F 1/266; G06F 13/4081; G06F 2213/0042; G06F 13/4282; H01R 31/005; H01R 31/02
See application file for complete search history.

(56) References Cited

U.S. PATENT DOCUMENTS

| 4,786,826 A * | 11/1988 | Clemente ................ H02M 3/10 327/383 |
| 2016/0352101 A1* | 12/2016 | Koo .......................... H02J 1/12 |
| 2017/0270067 A1* | 9/2017 | Hu ......................... G06F 13/366 |
| 2018/0060270 A1* | 3/2018 | Schnell ............... G06F 13/4282 |

* cited by examiner

*Primary Examiner* — Jared Fureman
*Assistant Examiner* — Duc M Pham
(74) *Attorney, Agent, or Firm* — JCIPRNET

(57) ABSTRACT

An USB hub including a power input port, a main power converting circuit, a first and a second type-C USB ports, and a first and a second power converting circuits is provided. The power input port receives an input power. The main power converting circuit converts the input power into a main power. The first and the second power converting circuits receive the main power respectively, and are coupled to the first and the second type-C USB ports respectively. The first and the second power converting circuits respectively obtain a first and a second operation power information of a first and a second external electronic devices, and respectively generate and provide a first and a second operating powers required by the first and the second external electronic devices for normal operation according to the first and the second operation power information.

12 Claims, 4 Drawing Sheets

UNIVERSAL SERIAL BUS HUB

CROSS-REFERENCE TO RELATED APPLICATION

This application claims the priority benefit of Taiwan application serial no. 105136159, filed on Nov. 7, 2016. The entirety of the above-mentioned patent application is hereby incorporated by reference herein and made a part of this specification.

BACKGROUND OF THE INVENTION

Field of the Invention

The invention relates to a hub, and particularly relates to an universal serial bus hub.

Description of Related Art

Presently, universal serial bus (USB) hub on the market generally has only one type-C USB port for implementing power transmission or data transmission with an electronic device coupled to the type-C USB port. Besides, the USB hub on the market generally adopts an analog circuit to convert an input power, so as to provide an output voltage to the electronic device coupled to the type-C USB port, where the output voltage provided by the USB hub is generally fixed, i.e. the output voltage cannot be adjusted along with different electronic devices. Therefore, usage flexibility of the USB hub is decreased. Moreover, the above USB hub probably cannot be adapted to electronic devices manufactured according to a future USB specification, and is eventually obsolete.

SUMMARY OF THE INVENTION

The invention is directed to a USB hub, which has a plurality of type-C USB ports. The USB hub could provide an operation power required for normal operation of an electronic device according to a demand of the electronic device plugged to the type-C USB port, by which not only usage flexibility is improved, design flexibility for supporting future USB specifications is also reserved.

The invention provides a USB hub including a power input port, a main power converting circuit, a first and a second type-C USB ports, and a first and a second power converting circuits. The power input port receives an input power. The main power converting circuit is coupled between the power input port and a power bus, and is configured to perform power conversion to the input power and output a main power to the power bus accordingly. The first and the second type-C USB ports are respectively connected to a first and a second external electronic devices to perform data transmission or power transmission. The first and the second power converting circuits are respectively connected to the power bus to receive the main power, and are respectively coupled to the first and the second type-C USB ports. The first and the second power converting circuits respectively obtain a first and a second operation power information of the first and the second external electronic devices, and respectively generate and provide a first and a second operation powers required for normal operation of the first and the second external electronic devices according to the first and the second operation power information.

In an embodiment of the invention, the first power converting circuit includes a first detecting unit, a first control unit, and a first power converting unit. The first detecting unit obtains the first operation power information. The first control unit is electrically connected to the first detecting unit. The first control unit outputs a first control signal according to the first operation power information. The first power converting unit is electrically connected to the first control unit. The first power converting unit generates the first operation power according to the first control signal.

In an embodiment of the invention, the first control unit is a stepless control voltage chip.

In an embodiment of the invention, when the input power is zero and the first external electronic device is an energy storage device, the first detecting unit outputs a discharge information, the first control unit outputs a power supply control signal according to the discharge information, and the first power converting unit generates a substitution power for substituting the main power to the power bus according to the power supply control signal.

In an embodiment of the invention, the second power converting circuit includes a second detecting unit, a second control unit, and a second power converting unit. The second detecting unit obtains the second operation power information. The second control unit is electrically connected to the second detecting unit. The second control unit outputs a second control signal according to the second operation power information. The second power converting unit is electrically connected to the second control unit. The second power converting unit generates the second operation power according to the second control signal.

In an embodiment of the invention, the second control unit is a stepless control voltage chip.

In an embodiment of the invention, the first detecting unit is connected to the second detecting unit. The first detecting unit and the second detecting unit determine the first detecting unit or the second detecting unit as a management unit according to a plugging sequence of the first and the second external electronic devices respectively connected to the first and the second type-C USB ports, and the first or the second power converting unit corresponding to the management unit supplies the first or the second operation power in priority.

In an embodiment of the invention, the first detecting unit is connected to the second detecting unit. The first detecting unit and the second detecting unit determine the first detecting unit or the second detecting unit as a management unit according to a priority sequence corresponding to the first and the second external electronic devices, and the first or the second power converting unit corresponding to the management unit supplies the first or the second operation power in priority.

In an embodiment of the invention, the USB hub further includes a user interface. The user interface is connected to the first detecting unit and the second detecting unit. The user interface provides a user to select the first detecting unit or the second detecting unit as the management unit, and the first or the second power converting unit corresponding to the management unit supplies the first or the second operation power in priority.

According to the above description, the USB hub of the invention has a plurality of type-C USB ports. The USB hub could provide an operation power required for normal operation of an electronic device according to a demand of the electronic device plugged to the type-C USB port, by which not only usage flexibility is improved, design flexibility for supporting future USB specifications is also reserved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
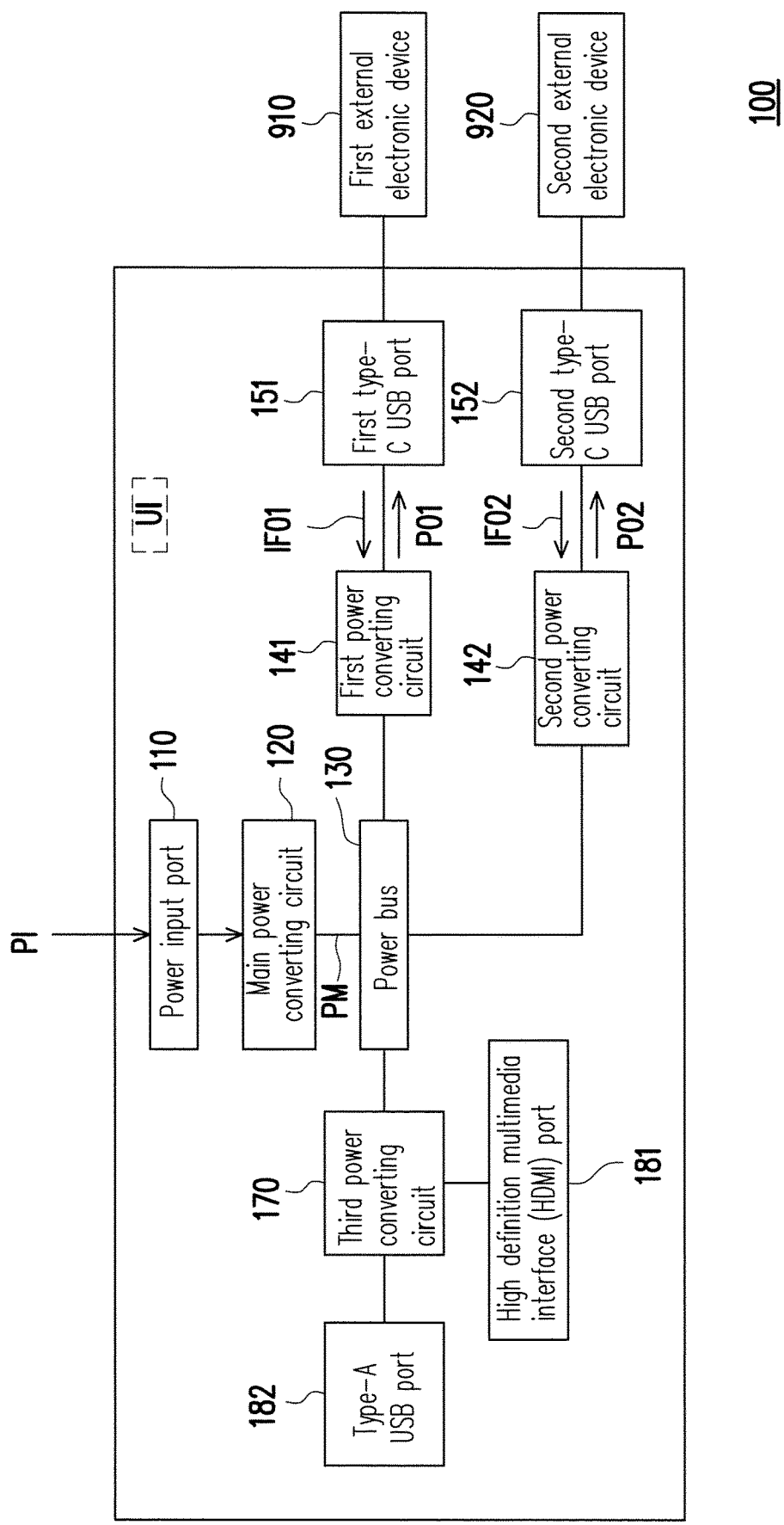
FIG. 1 is a block schematic diagram of a power transmission function of a universal serial bus (USB) hub according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a block schematic diagram of a power transmission function of a universal serial bus (USB) hub 100 according to an embodiment of the invention. The USB hub 100 of the present embodiment may include a power input port, a main power converting circuit, M type-C USB ports, and M power converting circuits corresponding to the M type-C USB ports, where M is a positive integer greater than or equal to 2. For simplicity's sake, it is assumed that M is equal to 2, and an exemplary embodiment where M is greater than 2 may be deduced by those skilled in the art according to following descriptions. Therefore, as shown in FIG. 1, the USB hub 100 may include a power input port 110, a main power converting circuit 120, a first type-C USB port 151, a second type-C USB port 152, a first power converting circuit 141 and a second power converting circuit 142.

The power input port 110 may receive an input power PI. The main power converting circuit 120 is coupled between the power input port 110 and a power bus 130, and is configured to perform power conversion to the input power PI and output a main power PM to the power bus 130 accordingly. In an embodiment of the invention, the input power PI may be an alternating current (AC) power, and the main power converting circuit 120 may be an AC to direct current (DC) converting circuit. In another embodiment of the invention, the input power PI may be a DC power provided by an external power converting device through power conversion, or a DC power directly provided by an energy storage device, and the main power converting circuit 120 may be a DC to DC converting circuit (for example, a boost circuit or a buck circuit, etc.). However, the invention is not limited thereto, and is depending on an actual application or design requirement.

The first type-C USB port 151 is used for connecting a first external electronic device 910 to implement data transmission or power transmission. The first power converting circuit 141 is coupled to the power bus 130 to receive the main power PM, and is coupled to the first type-C USB port 151. The first power converting circuit 141 may obtain a first operation power information IFO1 of the first external electronic device 910, and generate and provide a first operation power PO1 required for normal operation of the first external electronic device 910 according to the first operation power information IFO1, which is described in detail later.

Similarly, the second type-C USB port 152 is used for connecting a second external electronic device 920 to implement data transmission or power transmission. The second power converting circuit 142 is coupled to the power bus 130 to receive the main power PM, and is coupled to the second type-C USB port 152. The second power converting circuit 142 may obtain a second operation power information IFO2 of the second external electronic device 920, and generate and provide a second operation power PO2 required for normal operation of the second external electronic device 920 according to the second operation power information IFO2, which is described in detail later.

In an embodiment of the invention, the USB hub 100 further includes a type-A USB port 182, a third power converting circuit 170 and a high definition multimedia interface (HDMI) port 181, though the invention is not limited thereto, and is depending on an actual application or design requirement. The third power converting circuit 170 is coupled to the power bus 130 to receive the main power PM, and the third power converting circuit 170 is coupled to the type-A USB port 182 and the HDMI port 181. The third power converting circuit 170 is configured to perform power conversion to the main power PM to provide an operation power required for normal operation of an external electronic device (not shown) connected to the HDMI port 181 or the type-A USB port 182. Since the type-A USB port 182, the third power converting circuit 170 and the HDMI port 181 are known techniques and are not a focus of the invention, details thereof are not repeated.

Figure 2:
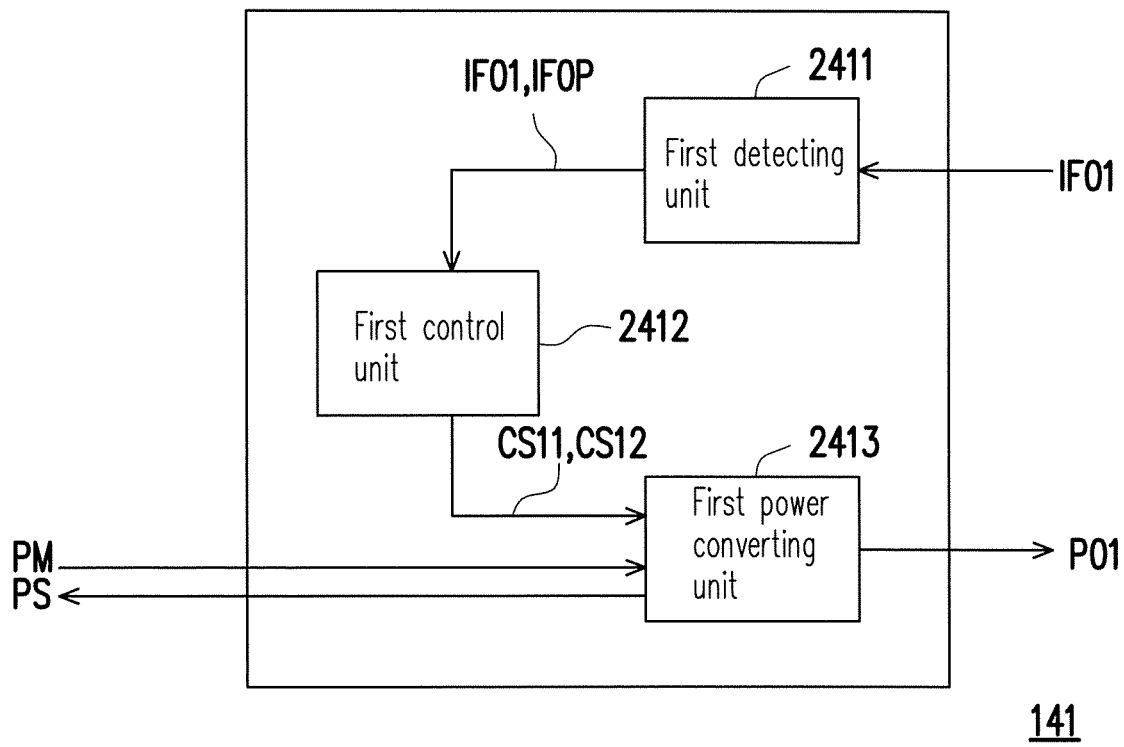
FIG. 2 is a block schematic diagram of a first power converting circuit of FIG. 1 according to an embodiment of the invention.

Referring to FIG. 1 and FIG. 2, FIG. 2 is a block schematic diagram of the first power converting circuit 141 of FIG. 1 according to an embodiment of the invention. The first power converting circuit 141 may include a first detecting unit 2411, a first control unit 2412, and a first power converting unit 2413. The first detecting unit 2411 is used for obtaining the first operation power information IFO1. The first control unit 2412 is electrically connected to the first detecting unit 2411. The first control unit 2412 outputs a first control signal CS11 according to the first operation power information IFO1. The first power converting unit 2413 is electrically connected to the first control unit 2412. The first power converting unit 2413 generates the first operation power PO1 according to the first control signal CS11.

Further, in an embodiment of the invention, the first external electronic device 910 may be an electronic device supporting a USB3.1 power delivery specification. Therefore, the first operation power information IFO1 of the first external electronic device 910 obtained by the first detecting unit 2411 may include any one of five profiles complied with the USB3.1 power delivery specification, as shown in table 1. The first operation power information IFO1 may include voltage information and current information (or power information) required for normal operation of the first external electronic device 910.

TABLE 1

| Power delivery profile | Power delivery specification |
| --- | --- |
| Profile 1 | 5 V/2 A (10 W) |
| Profile 2 | 5 V/2 A (10 W) |
|  | 12 V/1.5 A(Maximum 18 W) |
| Profile 3 | 5 V/2 A(10 W) |
|  | 12 V/3 A(Maximum 36 W) |
| Profile 4 | 5 V/2 A(10 W) |
|  | 12 V/3 A(36 W) |
|  | 20 V/3 A(Maximum 60 W) |
| Profile 5 | 5 V/2 A(10 W) |
|  | 12 V/5 A(60 W) |
|  | 20 V/5 A(Maximum 100 W) |

For example, if the first operation power information IFO1 obtained by the first detecting unit 2411 is the voltage information 12 volts and the current information 5 A of the profile 4 in the table 1, the first control unit 2412 may generate the first control signal CS11 according to the first operation power information IFO1, so as to control the first power converting unit 2413 to provide the first operation power PO1 with a voltage of 12V and a current of 5 A to the first external electronic device 910.

In another embodiment of the invention, the first external electronic device 910 may also be an electronic device not supporting the power delivery specification in the Table 1. In other words, the first operation power information IFO1 obtained by the first detecting unit 2411 may be none of the five profiles of the power delivery specification in the Table 1, and the first control unit 2412 may still generate the first control signal CS11 according to the first operation power information IFO1, so as to control the first power converting unit 2413 to provide the first operation power PO1 required for normal operation of the first external electronic device 910.

For example, if the first operation power information IFO1 obtained by the first detecting unit 2411 is voltage information of 10.3 volts and current information of 5 A, the first control unit 2412 may still generate the first control signal CS11 according to the first operation power information IFO1, so as to control the first power converting unit 2413 to provide the first operation power PO1 with a voltage of 10.3V and a current of 5 A to the first external electronic device 910. In other words, the first control unit 2412 may steplessly adjusts the output voltage of the first power converting unit 2413 according to the first operation voltage information IFO1. Therefore, not only usage flexibility of the USB hub of the invention is improved, design flexibility thereof for supporting future USB power delivery specifications is also reserved.

In an embodiment of the invention, the first detecting unit 2411 may be implemented by an existing USB power delivery controller. The first control unit 2412 may be a step control voltage chip or a stepless control voltage chip (i.e. a continuously control voltage chip), and both of the step and stepless control voltage chips may be implemented by micro controllers or micro processors in collaboration with firmware. Further, the step control voltage chip may control the first power converting unit 2413 to provide the powers complied with the five profiles of the USB3.1 power delivery specification, in another embodiment of the invention, the step control voltage chip may also divide a supply voltage (for example, 25V) of the main power PM into a plurality of steps (for example, 1024 steps). In this way, the step control voltage chip may control the first power converting unit 2413 to provide 1024 steps of different voltages, where an adjustment amplitude of each step is about 0.024V. Moreover, the more the number of the steps is, the further the step control voltage chip approaches to the stepless control voltage chip, so as to implement a purpose of stepless control. The first power converting unit 2413 may be implemented by a buck circuit (or a boost circuit), though the invention is not limited thereto, and is depending on an actual application or design requirement.

In an embodiment of the invention, when the input power PI is zero and the first external electronic device 910 is the energy storage device (for example, a power bank), the first external electronic device 910 may serve as a power supply of the USB hub 100. In this case, the first detecting unit 2411 may output discharge information IFOP. The first control unit 2412 outputs a power supply control signal CS12 according to the discharge information IFOP. The first power converting unit 2413 generates a substitution power PS for substituting the main power PM to the power bus 130 according to the power supply control signal CS12, so as to serve as a power supply of the second power converting circuit 142 and the third power converting circuit 170.

Figure 3:
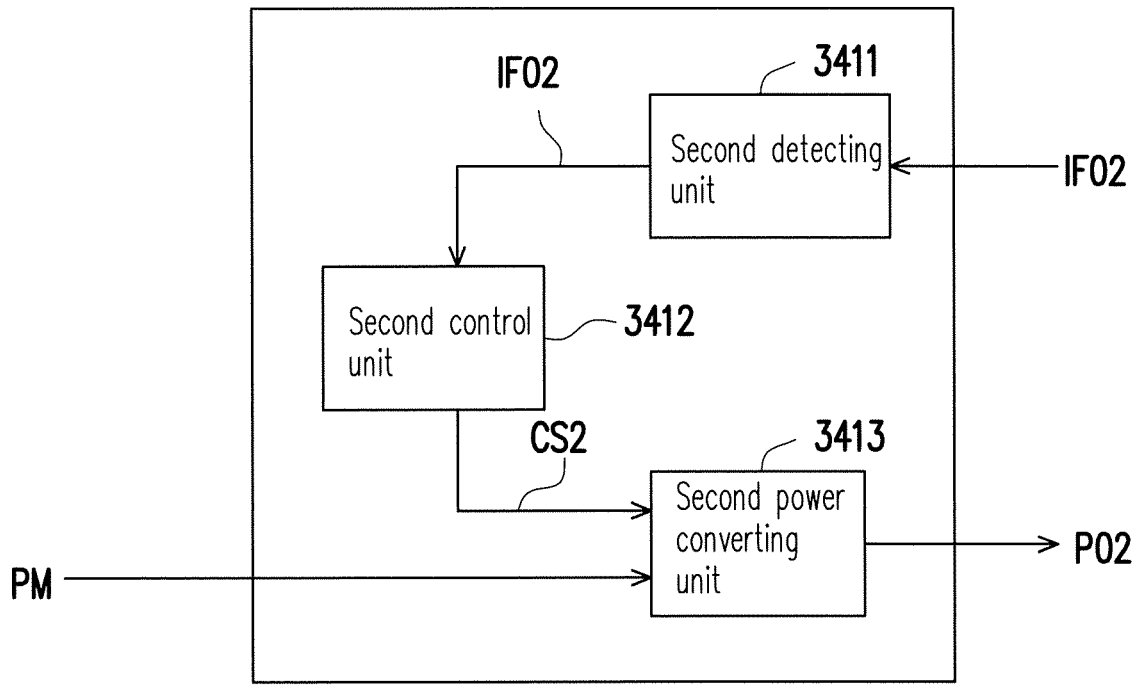
FIG. 3 is a block schematic diagram of a second power converting circuit of FIG. 1 according to an embodiment of the invention.

Referring to FIG. 1 and FIG. 3 together, FIG. 3 is a block schematic diagram of the second power converting circuit 142 of FIG. 1 according to an embodiment of the invention. The second power converting circuit 142 may include a second detecting unit 3411, a second control unit 3412, and a second power converting unit 3413. The second detecting unit 3411 is used for obtaining the second operation power information IFO2. The second control unit 3412 is electrically connected to the second detecting unit 3411. The second control unit 3412 may output a second control signal CS2 according to the second operation power information IFO2. The second power converting unit 3413 is electrically connected to the second control unit 3412. The second power converting unit 3413 may generate the second operation power PO2 according to the second control signal CS2. Since operations and implementations of the second detecting unit 3411, the second control unit 3412 and the second power converting unit 3413 are respectively similar to that of the first detecting unit 2411, the first control unit 2412 and the first power converting unit 2413 of FIG. 2, related descriptions of FIG. 2 may be referred for descriptions of FIG. 3, and details thereof are not repeated.

A power management function of the USB hub 100 is described below. Referring to FIG. 1, FIG. 2 and FIG. 3 together, in an embodiment of the invention, the first detecting unit 2411 and the second detecting unit 3411 communicate with each other to determine one of the first detecting unit 2411 and the second detecting unit 3411 to be a management unit. If it is determined that the first detecting unit 2411 is the management unit, the first power converting unit 2413 corresponding to the management unit (i.e. the first detecting unit 2411) supplies the first operation power PO1 to the first external electronic device 910 in priority. On the contrary, if it is determined that the second detecting unit 3411 is the management unit, the second power converting unit 3413 corresponding to the management unit (i.e. the second detecting unit 3411) supplies the second operation power PO2 to the second external electronic device 920 in priority.

In an embodiment of the invention, the first detecting unit 2411 and the second detecting unit 3411 may determine the first detecting unit 2411 or the second detecting unit 3411 as the management unit according to a plugging sequence of the first external electronic device 910 and the second external electronic device 920 respectively with the first type-C USB port 151 and the second type-C USB port 152. For example, if a time point that the first external electronic device 910 plugged to the first type-C USB port 151 is earlier than a time point that the second external electronic device 920 plugged to the second type-C USB port 152, the first detecting unit 2411 serves as the management unit, and the first power converting unit 2413 supplies the first operation power PO1 to the first external electronic device 910 in priority, and vice versa.

In another embodiment of the invention, the first detecting unit 2411 and the second detecting unit 3411 may determine the first detecting unit 2411 or the second detecting unit 3411 as the management unit according to a priority sequence of the first external electronic device 910 and the second external electronic device 920. The above priority sequence may be preset in firmware of the first detecting unit 2411 and the second detecting unit 3411, for example, the one with higher demand voltage has the priority, though the invention is not limited thereto. For example, it is preset that a demand voltage (for example, 12V) of the first external electronic device 910 is greater than a demand voltage (for example, 5V) of the second external electronic device 920. In this case, a power supplying sequence of the first external electronic device 910 is prior to a power supplying sequence of the second external electronic device 920, and the first detecting unit 2411 serves as the management unit, and the first power converting unit 2413 supplies the first operation power PO1 to the first external electronic device 910 in priority, and vice versa.

In another embodiment of the invention, the USB hub 100 further includes a user interface UI. The user interface UI connects to the first detecting unit 2411 and the second detecting unit 3411. Particularly, the user interface UI may provide the user to select the first detecting unit 2411 or the second detecting unit 3411 to serve as the management unit. For example, if the user selects the first detecting unit 2411 to serve as the management unit through the user interface UI, the first power converting unit 2413 supplies the first operation power PO1 to the first external electronic device 910 in priority, and vice versa. The user interface UI may be implemented by a keyboard module or a touch display module, which is not limited by the invention.

In an embodiment of the invention, the management unit may not only determine a power supplying sequence between the first external electronic device 910 and the second external electronic device 920, but also detect the maximum power that provided by the input power PI (or the main power PM) to serve as an input power value, and performs power allocation according to the detected input power value and the power supplying sequence.

For example, it is assumed that the maximum power provided by the input power PI is 150 watts (W), and the power supplying sequence of the first external electronic device 910 is prior to the power supplying sequence of the second external electronic device 920. When the power required for the normal operation of the first external electronic device 910 is 100 W (recorded in the first operation power information IFO1), and the power required for the normal operation of the second external electronic device 920 is 20 W (recorded in the second operation power information IFO2), the management unit determines that the maximum power 150 W of the input power PI is enough to supply the power of 100 W required for the normal operation of the first external electronic device 910, and the management unit activates the first power converting unit 2413 to supply the first operation power PO1 (i.e. 100 W) to the first external electronic device 910 in priority. Then, the management unit may determine that the remained power of the input power PI is 50 W, which is still enough to supply the power of 20 W required for the normal operation of the second external electronic device 920, and the management unit activates the second power converting unit 3413 to supply the second operation power PO2 (i.e. 20 W) to the second external electronic device 920.

In the above exemplary embodiment, if the power required for the normal operation of the first external electronic device 910 is 100 W, and the power required for the normal operation of the second external electronic device 920 is 60 W, the management unit determines that the maximum power 150 W of the input power PI is enough to supply the power of 100 W required for the normal operation of the first external electronic device 910, and the management unit activates the first power converting unit 2413 to supply the first operation power PO1 (i.e. 100 W) to the first external electronic device 910 in priority. Then, the management unit may determine that the remained power of the input power PI is 50 W, which is not enough to supply the power of 60 W required for the normal operation of the second external electronic device 920, and the management unit does not activates the second power converting unit 3413, so that the second external electronic device 920 is not supplied with power.

In another embodiment, it is assumed that the maximum power that may be provided by the input power PI is 50 W, and the power supplying sequence of the first external electronic device 910 is prior to the power supplying sequence of the second external electronic device 920. When the power required for the normal operation of the first external electronic device 910 is 100 W, and the power required for the normal operation of the second external electronic device 920 is 20 W, the management unit may determine that the maximum power 50 W of the input power PI is not enough to supply the power of 100 W required for the normal operation of the first external electronic device 910, and the management unit does not activate the first power converting unit 2413, so that the first external electronic device 910 is not supplied with power. Then, the management unit determines that the maximum power 50 W of the input power PI is enough to supply the power of 20 W required for the normal operation of the second external electronic device 920, and the management unit activates the second power converting unit 3413 to supply the second operation power PO2 (i.e. 20 W) to the second external electronic device 920.

It should be noted that in the aforementioned embodiment, although the operations of two type-C USB ports (i.e. the first type-C USB port 151 and the second type-C USB port 152) and the corresponding two power converting circuits (i.e. the first power converting circuit 141 and the second power converting circuit 142) are described, those skilled in the art should understand that operations of three (or more) type-C USB ports and corresponding three (or more) power converting circuits may be deduced according to the description of the aforementioned embodiment, and details thereof are not repeated.

Figure 4:
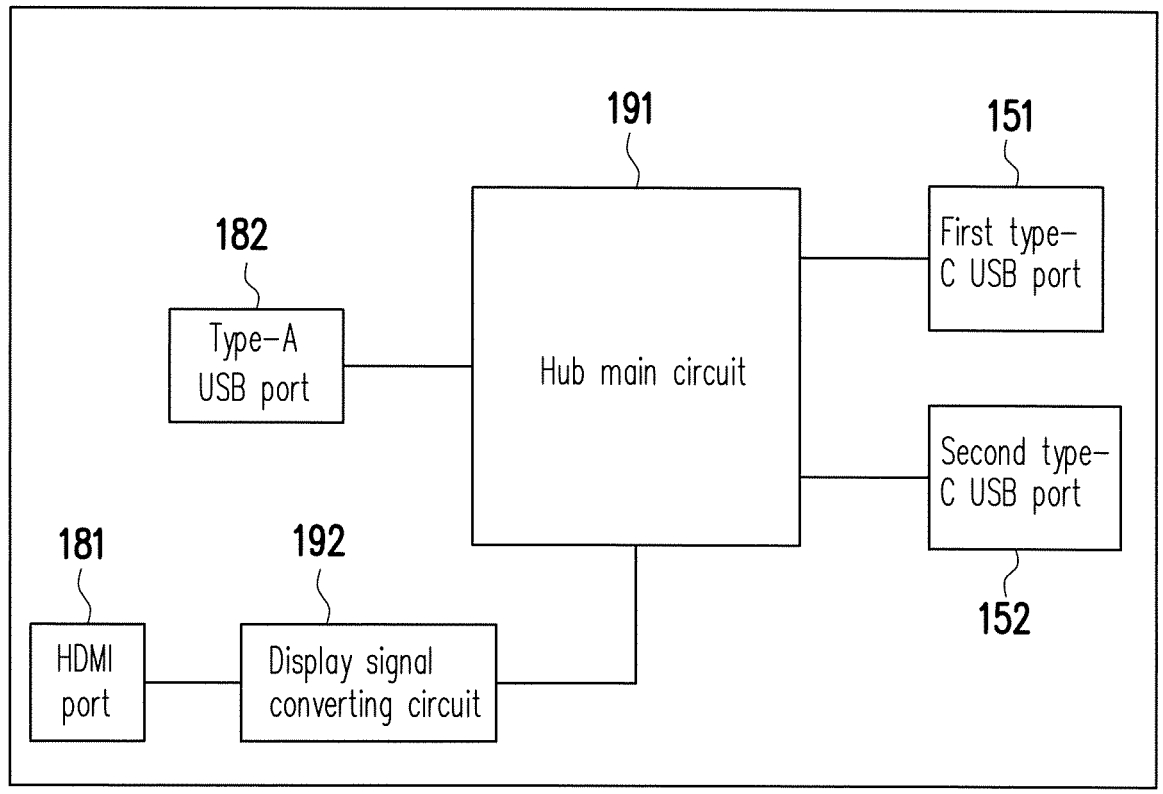
FIG. 4 is a block schematic diagram of a data transmission function of the USB hub according to an embodiment of the invention.

Referring to FIG. 4, FIG. 4 is a block schematic diagram of a data transmission function of the USB hub 100 according to an embodiment of the invention. As shown in FIG. 4, the USB hub 100 may further include a hub main circuit 191 and a display signal converting circuit 192. The hub main circuit 191 is coupled to the first type-C USB port 151, the second type-C USB port 152, the type-A USB port 182 and the display signal converting circuit 192, and is configured to perform data transmission among the first type-C USB port 151, the second type-C USB port 152, the type-A USB port 182 and the display signal converting circuit 192. The display signal converting circuit 192 is coupled between the hub main circuit 191 and the HDMI port 181, and is configured to convert a signal with a USB specification into a signal with a HDMI specification. Since the hub main circuit 191 and the display signal converting circuit 192 are known techniques and are not a focus of the invention, details thereof are not repeated.

Figure 5:
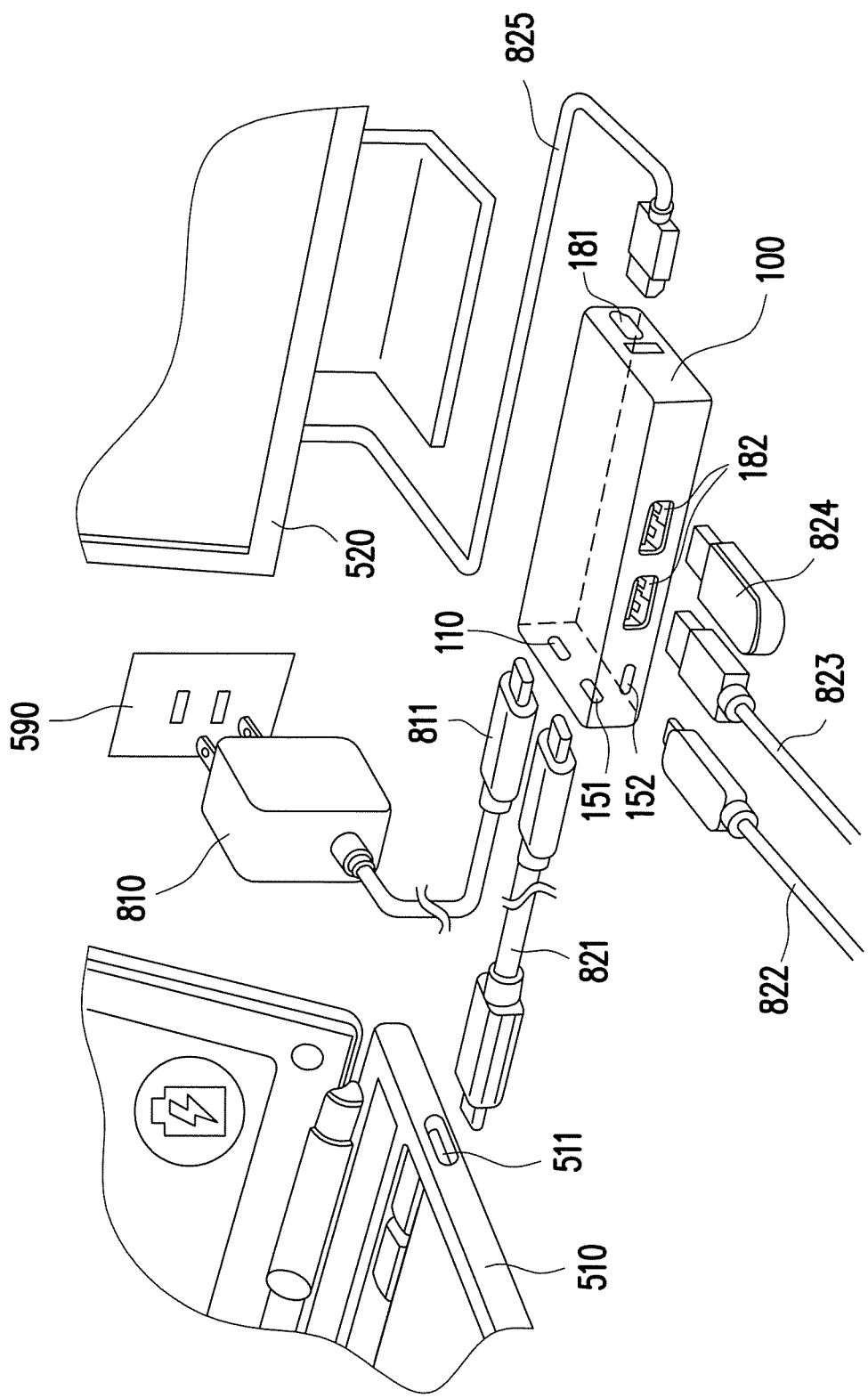
FIG. 5 is a schematic diagram of an actual application of the USB hub according to an embodiment of the invention.

Referring to FIG. 1 and FIG. 5, FIG. 5 is a schematic diagram of an actual application of the USB hub 100 of FIG. 1 according to an embodiment of the invention, though the invention is not limited thereto. An adapter 810 may be plugged into a receptacle 590 to receive an AC power, and performs a power conversion to the AC power to provide the DC-type input power PI (shown in FIG. 1). The power input port 110 of the USB hub 100 may be connected to a plug 811 of the adapter 810 to receive the input power PI (shown in FIG. 1). In the exemplary embodiment shown in FIG. 5, the plug 811 of the adapter 810 may be a type-C USB plug, and the power input port 110 of the USB hub 100 may be a type-C USB port, though the invention is not limited thereto, which are depending on an actual application or design requirement.

The first type-C USB port 151 of the USB hub 100 may be connected to a type-C USB port 511 of a notebook computer 510 (i.e. the first external electronic device 910 of FIG. 1) to implement data transmission or power transmission through a type-C USB transmission line 821. The USB hub 100 may obtain the first operation power information IFO1 (shown in FIG. 1) of the notebook computer 510, and generate and provide the first operation power PO1 (shown in FIG. 1) required for normal operation of the notebook computer 510 according to the first operation power information IFO1.

Similarly, the second type-C USB port 152 of the USB hub 100 may be connected to the second external electronic device 920 (for example, a tablet personal computer (PC) or a smart handheld device, etc.) of FIG. 1 to implement data transmission or power transmission through a type-C USB transmission line 822. The USB hub 100 may obtain the second operation power information IFO2 (shown in FIG. 1) of the second external electronic device 920, and generate and provide the second operation power PO2 (shown in FIG. 1) required for normal operation of the second external electronic device 920 according to the second operation power information IFO2.

The type-A USB port 182 of the USB hub 100 may be directly plugged with a USB 3.0/2.0 device (for example, a flash drive 824 shown in FIG. 5), or may be connected to a USB 3.0/2.0 device (now shown, for example, an external hard drive, a camera, a mouse, a keyboard, etc.) through a type-A USB transmission line 823, so as to supply power to the USB 3.0/2.0 device or implement data transmission with the USB 3.0/2.0 device. The HDMI port 181 of the USB hub 100 may be connected to an electronic device 520 (for example, a television or a display, etc.) through an HDMI transmission line 825, so as to supply power to the electronic device 520 or implement data transmission with the electronic device 520.

Detailed operations of the USB hub 100 of FIG. 5 may refer to related descriptions of FIG. 1 to FIG. 4, and details thereof are not repeated.

In summary, the USB hub of the invention has a plurality of type-C USB ports. The USB hub is adapted to provide an operation power required for normal operation of an electronic device according to a demand of the electronic device plugged to the type-C USB port, by which not only usage flexibility is improved, design flexibility for supporting future USB specifications is also reserved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An universal serial bus (USB) hub, comprising:
a power input port, configured to receive an input power;
a main power converting circuit, coupled between the power input port and a power bus, and configured to perform power conversion to the input power and output a main power to the power bus accordingly;
a first and a second type-C USB ports, respectively connected to a first and a second external electronic devices to perform data transmission or power transmission; and
a first and a second power converting circuits, respectively connected to the power bus to receive the main power, and respectively coupled to the first and the second type-C USB ports, wherein the first and the second power converting circuits respectively obtain a first and a second operation power information of the first and the second external electronic devices, and respectively generate and provide a first and a second operation powers required for normal operation of the first and the second external electronic devices according to the first and the second operation power information,
wherein the first power converting circuit comprises:
a first detecting unit, obtaining the first operation power information;
a first control unit, electrically connected to the first detecting unit, and outputting a first control signal according to the first operation power information; and
a first power converting unit, electrically connected to the first control unit, and generating the first operation power according to the first control signal,
wherein when the input power is zero and the first external electronic device is an energy storage device, the first detecting unit outputs a discharge information, the first control unit outputs a power supply control signal according to the discharge information, and the first power converting unit generates a substitution power for substituting the main power to the power bus according to the power supply control signal.

2. The USB hub as claimed in claim 1, wherein the first control unit is a stepless control voltage chip.

3. The USB hub as claimed in claim 1, wherein the second power converting circuit comprises:
a second detecting unit, obtaining the second operation power information;
a second control unit, electrically connected to the second detecting unit, and outputting a second control signal according to the second operation power information; and
a second power converting unit, electrically connected to the second control unit, and generating the second operation power according to the second control signal.

4. The USB hub as claimed in claim 2, wherein the second power converting circuit comprises:
- a second detecting unit, obtaining the second operation power information;
- a second control unit, electrically connected to the second detecting unit, and outputting a second control signal according to the second operation power information; and
- a second power converting unit, electrically connected to the second control unit, and generating the second operation power according to the second control signal.

5. The USB hub as claimed in claim 3, wherein the second control unit is a stepless control voltage chip.

6. The USB hub as claimed in claim 4, wherein the second control unit is a stepless control voltage chip.

7. The USB hub as claimed in claim 3, wherein the first detecting unit is connected to the second detecting unit, the first detecting unit and the second detecting unit determine the first detecting unit or the second detecting unit as a management unit according to a plugging sequence of the first and the second external electronic devices respectively connected to the first and the second type-C USB ports, and the first or the second power converting unit corresponding to the management unit supplies the first or the second operation power in priority.

8. The USB hub as claimed in claim 4, wherein the first detecting unit is connected to the second detecting unit, the first detecting unit and the second detecting unit determine the first detecting unit or the second detecting unit as a management unit according to a plugging sequence of the first and the second external electronic devices respectively connected to the first and the second type-C USB ports, and the first or the second power converting unit corresponding to the management unit supplies the first or the second operation power in priority.

9. The USB hub as claimed in claim 3, wherein the first detecting unit is connected to the second detecting unit, the first detecting unit and the second detecting unit determine the first detecting unit or the second detecting unit as a management unit according to a priority sequence corresponding to the first and the second external electronic devices, wherein the first or the second power converting unit corresponding to the management unit supplies the first or the second operation power in priority.

10. The USB hub as claimed in claim 4, wherein the first detecting unit is connected to the second detecting unit, the first detecting unit and the second detecting unit determine the first detecting unit or the second detecting unit as a management unit according to a priority sequence corresponding to the first and the second external electronic devices, wherein the first or the second power converting unit corresponding to the management unit supplies the first or the second operation power in priority.

11. The USB hub as claimed in claim 3, further comprising:
- a user interface, connected to the first detecting unit and the second detecting unit, for providing a user to select the first detecting unit or the second detecting unit as the management unit, wherein the first or the second power converting unit corresponding to the management unit supplies the first or the second operation power in priority.

12. The USB hub as claimed in claim 4, further comprising:
- a user interface, connected to the first detecting unit and the second detecting unit, for providing a user to select the first detecting unit or the second detecting unit as the management unit, wherein the first or the second power converting unit corresponding to the management unit supplies the first or the second operation power in priority.

* * * * *